Dec. 24, 1957  G. L. BORELL  2,817,806
RELAY AND CONTROL SYSTEM
Filed Jan. 2, 1953  3 Sheets-Sheet 1

INVENTOR
GEORGE L. BORELL
BY
Pennie, Edmonds, Morton, Barrows & Taylor
ATTORNEYS Dec. 24, 1957  G. L. BORELL  2,817,806
RELAY AND CONTROL SYSTEM
Filed Jan. 2, 1953  3 Sheets-Sheet 2
Fig. 3,
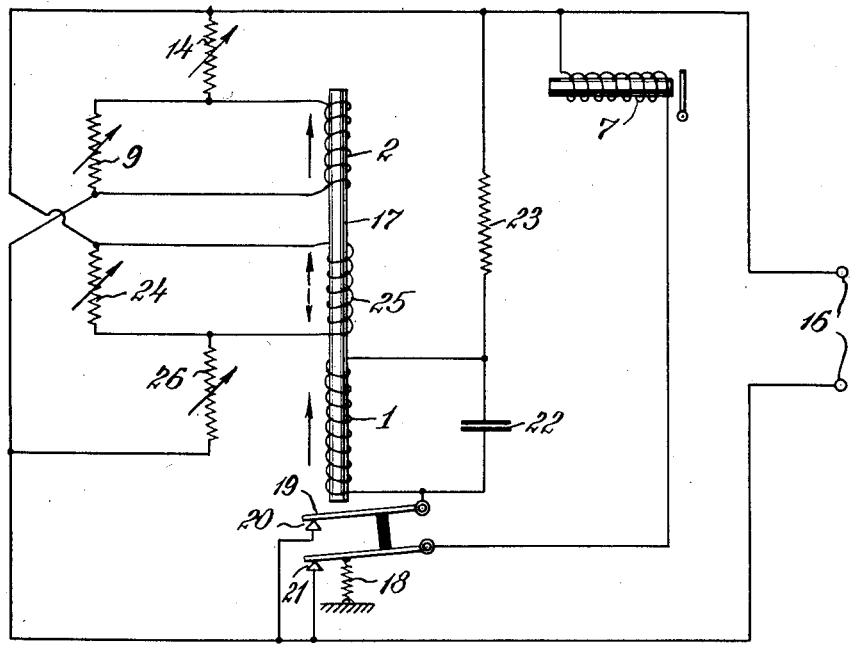
Fig. 4,
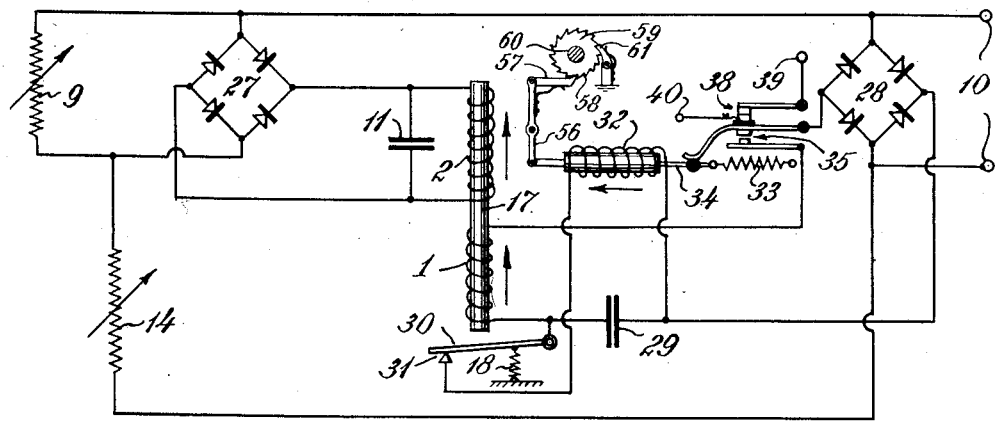
INVENTOR
GEORGE L. BORELL
BY
Pennie, Edmonds, Morton, Barrows & Taylor
ATTORNEYS

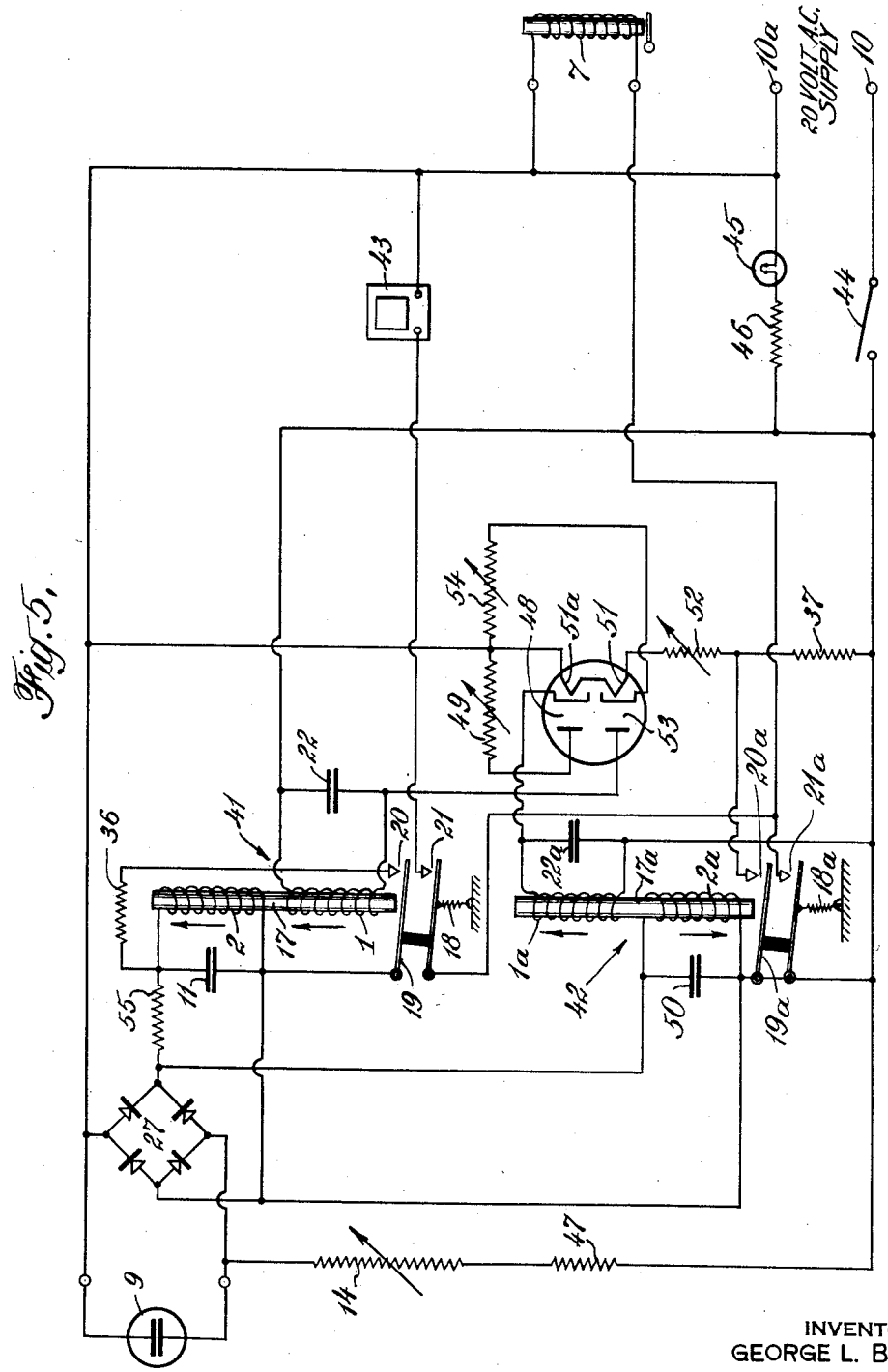

United States Patent Office 2,817,806
Patented Dec. 24, 1957

2,817,806

RELAY AND CONTROL SYSTEM

George L. Borell, Ridgewood, N. J., assignor to Economics Laboratory, Inc., St. Paul, Minn., a corporation of Delaware Application January 2, 1953, Serial No. 329,354

21 Claims. (Cl. 323—2)

This invention relates to signal and control systems in which a condition or an operation must be indicated or controlled within close limits. It is especially adapted to control the concentration of solutions and the like and is, therefore, here described in that connection, although the invention has many other applications which will occur to those skilled in the art. The invention is an improvement over that described in U. S. Letters Patent 2,525,016, granted October 10, 1950, especially in that it is more simple and rugged, considerably cheaper to manufacture, and may be operated from a low-voltage alternating or direct current power source.

In brief, the present invention comprises an electromechanical relay so connected as to be self-oscillating, viz., to open and close periodically when suitably connected to a source of power, and means for modifying its action. As a result the control functions periodically, and the timing of the control periods is automatically modified to meet the requirements of the condition to be corrected.

The invention will be better understood from the following description considered in connection with the accompanying drawings, wherein:

Fig. 3 is a modification of the arrangement of Fig. 2 in that it includes an additional modulating coil connected to an additional sensing element so that the operation of the relay may be influenced or modified by a plurality of variable conditions;

Figure 2:
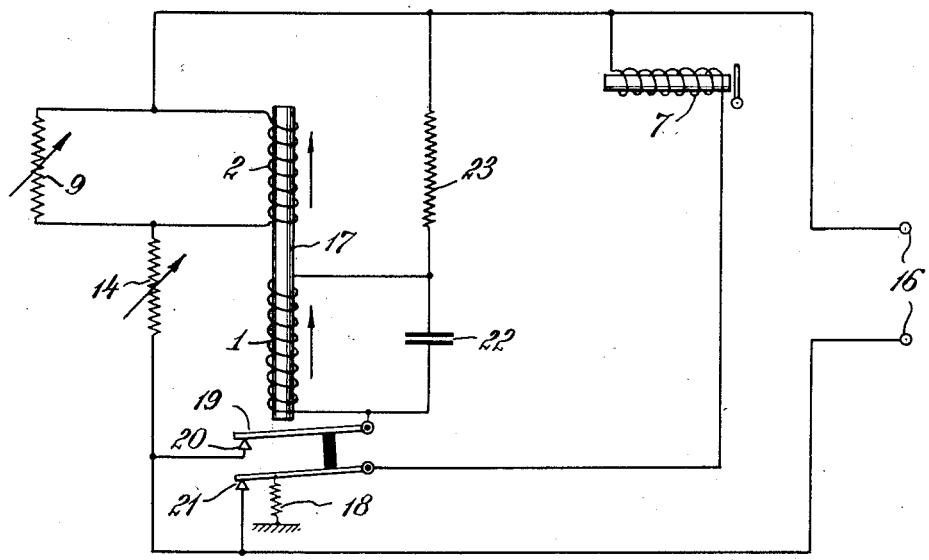
Fig. 2 is a circuit diagram of a modification of the invention which includes a relay constructed differently from that of Fig. 1, but the essential operation and the nature of the control are fundamentally the same.

Fig. 4 illustrates a third modification of the invention which includes an auxiliary relay, but in many respects is similar to the system of Fig. 2; and Fig. 5 is a circuit diagram of a more detailed system than those of the preceding figures and which includes two electromechanical relays one of which is similar to that of Fig. 2 and the other of which is physically similar to the first, but is connected differently. The system of Fig. 5 also includes rectifying and time-delay diodes, and other features which will be described below.

Figure 1:
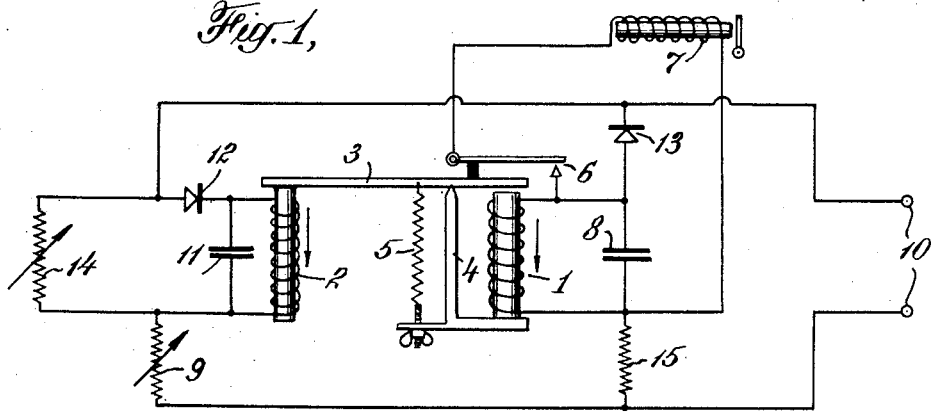
Fig. 1 is a circuit diagram of a control system in accordance with the invention which includes an electromechanical relay of novel design having two magnetic coils which operate in opposition on an armature.

Referring first to the system of Fig. 1, the electromechanical relay of the invention comprises an actuating or reset magnet coil 1 and a modulating or sensing coil 2 both of which mechanically act upon opposite ends of armature 3 which is pivoted on a fulcrum support 4. Adjustable biasing spring 5 tends to tilt the armature downward to the left in the drawing and thus tends to open the contacts 6. These contacts are connected in a discharge or work circuit in which a controlled element 7 is connected. In this example element 7 may be assumed to comprise a magnetically operated valve which controls the flow of detergent to a washing tank.

Condenser 8, which should be of large capacitance, is shunted across coil 1 and introduces a certain desired delay in the operation of the relay and in addition accumulates sufficient energy to permit the direct operation by its discharge current of the controlled element. Thus it is possible to operate the entire system on a low voltage supply such, for example, as 20 volts A. C. or D. C. The output of an inexpensive bell ringing transformer is usually suitable as a power source. This greatly simplifies the cost of manufacture because it decreases the insulation and other problems incident to the use of higher voltages, and also permits relatively simple and economical installations free of the Underwriters' code requirements in respect to the usual 120-volt systems. All of the modifications of the invention herein described include the same advantage.

The sensing element 9 and sensing magnet coil 2 are connected in series across the power source 10. Condenser 11 shunting coil 2 is desirable to improve the operation of the sensing coil if the system is operated on alternating current. It is for this reason also that rectifiers 12 and 13 are included, because it is assumed that the relay here shown is of the direct-current type. The circuit of Fig. 1 is operable interchangeably on alternating current or direct current, but if it be intended for operation only on direct current, then rectifiers 12 and 13 and condenser 11 may be omitted. Although any suitable rectifiers may be employed for the indicated purpose those of the selenium type are preferred.

Sensing element 9 is essentially a device of which the apparent impedance varies in accordance with, or as a function of, a variable condition, here, the condition to be controlled. Such an element which would be suitable for use in the control of the concentration of a detergent solution comprises the conductivity cell described in U. S. Letters Patent No. 2,560,209, granted July 10, 1951. Impedance 14 which may comprise a variable resistor is provided to adjust the control point, viz., to determine the magnitude of the condition to be controlled at which the relay and its associated system will function to control that condition. Depending upon the sense of variation of the condition to be controlled and the inherent characteristics of the sensing element, it may be necessary to interchange the position in the circuit of element 9 and resistor 14.

The operation of the control system of Fig. 1 is as follows: It will be noted that the sensing magnet coil 2 is connected through sensing element 9 to the power source. The current flowing through coil 2 will be sufficient with the aid of bias spring 5 to tilt the armature to the left from the fulcrum point, thus holding contacts 6 open. Storage condenser 8 is connected to the power source through resistor 15 and rectifier 13, thus charging at a rate determined by the resistance of resistor 15. When the voltage across this condenser is sufficient the reset coil 1 is magnetically stronger than the sensing coil 2 and so swings the armature down to the right of fulcrum 4. This closes contacts 6 and connects solenoid 7 across condenser 8 which discharges through it, actuating the solenoid.

When the sensing element 9 is connected as shown, in series with coil 2, and the various elements are properly adjusted, reset coil 1 in its normal condition will just balance the pull of the sensing coil on the armature and the relay contacts will remain open. Further, when the impedance of the sensing element increases (as would be the case if the detergent solution became weaker) less current would flow through the sensing coil, and the actuating coil will tilt the armature to close contacts 6. To afford optimum control the impedance of elements 9 and 14 should be such that the division of voltage between them is substantially equal at the control point, viz., the balanced relation obtaining under correct or normal operating conditions.

When the charge on condenser 8 has been dissipated, the pull of magnet coil 1 on the armature decreases and the contacts 6 will open, provided the current in coil 2 is of a magnitude representing the normal or control point condition. Hence, as long as the control point condition is maintained, the forces on the armature are balanced and the relay remains unactuated. Also, if the current in coil 2 is in excess of that obtaining under the control point condition, the relay will remain unactuated. However, when, and as long as, the current in coil 2 (which is a function of the departure from the control point condition) is less than normal, then the relay will continue to oscillate, opening and closing its contacts periodically and thereby actuating the solenoid 7 periodically. As the current in coil 2 decreases, the actuation periods of the relay will become more rapid, and hasten the correction required to effect a condition of equilibrium again. Conversely, as the desired condition, such as the solution concentration in a wash tank, is approached as the result of increased supply of detergent thereto, the relay will resume oscillating, with the "off" periods of progressively increased length until the control point is reached and the relay contacts remain open. The self-oscillation of the relay results from the inherent relay differential together with the change in current in the reset coil due to the charging and discharging of the storage condenser. Relay operating differential is the difference in value of current required to actuate and to deactuate the relay.

Because of the fact that coils 1 and 2 buck each other in their effect on the armature, the system of Fig. 1 inherently provides a substantial degree of compensation for line voltage drift, since a change of applied line voltage will within reasonable limits cause the same effect at both ends of the armature and thus the measure of control will not be affected. The same advantage is inherent in the system of Fig. 5 which will be described below.

Consideration of the relay of Fig. 1 and its connections in the system will demonstrate that the equivalent of the above-described operation will result from various rearrangements. For instance, the sensing coil can be positioned above the armature so that it cooperates mechanically with the reset coil instead of opposing it. The same type of control could then be effected by reversing the effect of the sensing device, as by interchanging it with the element 14. Alternatively, the sensing coil could be placed on the same side of the fulcrum as the actuating coil and equivalent results attained. Relays which include the latter concept are illustrated in others of the figures.

The modification of Fig. 2 employs a relay of different type from that of Fig. 1 and the circuit connections are different in some respects, although the control afforded thereby may be substantially the same.

For simplicity the circuit diagram of Fig. 2 has been shown as adapted for operation on direct current from the power source 16. But it, as well as the system of Fig. 3, could readily be adapted for alternating current operation by including rectifiers in the manner shown in Fig. 1 or Fig. 4.

The relay of Fig. 2 comprises an actuating or reset coil 1 and a sensing coil 2, both wound on core 17. Coils 1 and 2 are connected in this case so that their magnetic effect is mutually aiding. When the magnetic attraction of core 17 is sufficient to overcome the pull of spring 18 (which may be adjustable) armature 19 will be raised opening contacts 20 and 21. In this embodiment a sensing element 9 is connected in shunt to sensing coil 2 and is connected in series with control point adjusting resistor 14 across the power source 16. As before, a storage condenser 22 is connected to the line through the charging resistor 23. Here, however, the charging circuit is closed to the other side of the power source through contacts 20 of the relay. Solenoid 7, which represents the element to be controlled, is connected to the power source by closure of contacts 21 which occurs simultaneously with the closure of contacts 20.

The operation of the control system of Fig. 2 is as follows: The relay is normally held in actuated position with the contacts open by action of the sensing coil 2 against the pull of spring 18 which tends to close the contacts. When the impedance of the sensing device decreases, the pull of the sensing coil on the armature becomes weaker, allowing the spring to close the contacts. Upon closure of the contacts storage condenser 22 is connected across the power line through the resistor 23, and as the condenser charge increases, the current through coil 1 increases sufficiently to actuate the relay again and open the contacts. Repetition of this operation results in oscillation of the relay. There is a time delay in the opening action depending upon how long a period is required to charge condenser 22 to a value at which the relay will be actuated. Thus, the normal rate of oscillation of the relay can be set by appropriate selection of the resistance of resistor 23 and the capacitance of condenser 22, in combination with adjustment of spring 18. After the contacts open, they will close again if the sensing device is of an apparent impedance indicating the need for further correction. As before, the control point may be adjusted by adjustment of variable resistor 14. Also, as in the embodiment of Fig. 1 the rate of oscillation and hence the repetition rate and period of the control pulses which actuate element 7 will depend upon the degree of departure of the impedance of the sensing element from the preselected control-point impedance.

The embodiment represented in Fig. 3 is basically the same as the system of Fig. 2, corresponding elements thereof having been indicated by the same reference characters, as in all the figures. However, the system of Fig. 3 includes an additional sensing element 24, and an additional sensing coil 25 which is wound on core 17 in common with the sensing coil 2 and reset coil 1. Variable resistor 26 is connected in series between sensing element 24 and the power line and corresponds to control point resistor 14, which is associated with sensing element 9. The double arrow adjacent coil 25 indicates that this coil with its sensing element may be arranged so as either to aid or oppose the magnetic effect of coil 2 on the core 17, although as illustrated, coil 25 opposes coils 1 and 2. Thus a variety of control effects may be had depending upon the nature of the variable conditions which are intended to modify the normal oscillations of the relay. For example, one condition might comprise solution concentration and the other temperature, or the second might comprise solution height. To sense these different conditions, of course, different types of sensing elements are required. Elements suitable for such purposes are known in the art and do not form a part of the present invention. Under some conditions the sensing elements 9 and 24 or the corresponding coils 2 and 25 may be connected in the arms of a Wheatstone bridge, in which case a more precise balance at the control point may be attained.

The embodiment of the invention illustrated in Fig. 4 is capable of producing the same type of control as that resulting from the use of the circuits of the systems of the other figures, but the circuit arrangement is different from the others in some respects. In the present system there are included, in effect, two relays between which the actuation is divided. Here, as in the system of Fig. 2, the actuating or reset coil 1 and the sensing coil 2 are arranged so as magnetically to aid in respect to core 17. However, as explained in connection with the system of Fig. 1, if the sensing element and control point resistor are interchanged, or if the impedance of the sensing element varies in the opposite direction, then the sensing coil 2 should be arranged to oppose the magnetic effect of reset coil 1.

The second relay is in the form of a solenoid switch having contacts 35 which open when the solenoid is actuated, and an additional set of contacts 38 insulated from contacts 35, which close when contacts 35 open. These contacts 38, by their leads 39, 40, may be connected in an external circuit to be controlled. Such a controlled circuit includes solenoid valve 7 of Figs. 1–3. With the arrangement just described the external circuit to be controlled will be actuated whenever solenoid 32 is actuated. However, by obvious rearrangement of contacts 38 the external circuit can as readily be actuated when solenoid 32 is deactuated.

In this embodiment it is assumed that the power supply is alternating, and full-wave rectifiers 27 and 28 are included to energize the sensing circuit and the relay actuating circuit respectively, with unidirectional current. Should direct-current supply be employed, these rectifiers may be omitted, and filter condenser 11 may also be omitted, as in Fig. 3.

The operation of the system of Fig. 4 is as follows: The system is assumed to be adjusted so that when the sensing circuit is in its normal or control point condition the current through sensing coil 2 will cooperate with the current in coil 1 to hold armature 30 in actuated position, viz., so that contacts 31 are open. When these contacts are open the circuit through solenoid 32 is open and spring 33 maintains plunger 34 in its unactuated position, rather than in the actuated position as shown. In this position contacts 35 are closed and thus the circuit through reset coil 1 and storage condenser 29 is closed through rectifier 28 and thence to power source 10. This will maintain the condenser 29 charged and will result in the flow of only a small leakage current through coil 1.

When the impedance of sensing element 9 decreases, the current through sensing coil 2 will decrease and the magnetic attraction of core 17 on armature 30 will decrease. (As before, if the sensing element impedance increases with departure of the detected condition from normal, impedance 14 may be considered to represent the sensing element and rectifier 27 would be connected across it.) With sufficient drop in current in coil 2, spring 18 (which as in all other corresponding cases herein described, should be adjustable) will overcome the attraction of core 17, closing contacts 31. This connects solenoid coil 32 directly across condenser 29 which thus discharges through coil 32 and actuates the solenoid, opening contacts 35 and closing contacts 38. It is assumed that coil 32 inherently includes sufficient direct-current resistance to effect the discharge of condenser 36 within a preselected time interval. Otherwise it may be desirable to connect a suitable resistor in series with coil 32. If the conditions in the sensing circuit remain as above assumed, the solenoid 32 will remain actuated until condenser 29 is discharged, whereupon spring 33 will withdraw plunger 34, thus reclosing contacts 35. This will reconnect condenser 29 to the power source and in time will charge it again.

If the decrease in current through sensing coil 2 was small due to a comparatively small departure of the detected condition from normal, then the condenser-charging current through reset coil 1 will be sufficient to actuate armature 30, opening contacts 31. If the magnitude of correction of the detected condition during the period that contacts 38 were closed was sufficient to restore that condition to normal, then armature 30 will remain in actuated position and solenoid 32 will remain in deactuated position. However, if the normal condition was not restored, then the oscillatory operation above described will be repeated until the normal condition is restored.

In an extreme case, such as would result from a large departure from normal of the detected condition, the charging current through coil 1 will be insufficient to attract armature 30 with the result that solenoid 32 will remain in its actuated condition and contacts 38 will remain closed. Under these conditions the correcting operation will be continuous rather than intermittent, until the condition to be corrected is nearly restored to normal, at which point the oscillation of the relay and the intermittent operation of the solenoid will be resumed. This automatically slows down the corrective operation increasingly as the normal or control point is approached and thus avoids overshooting, viz., over-correction.

It will be noted that pivoted to plunger 34, of solenoid coil 32 of Fig. 4, is a lever arm 56. This arm terminates in a pawl 57 which cooperates with teeth 58 on ratchet wheel 59. Thus each operation of the plunger 34 causes ratchet wheel 59 to rotate to a degree determined by the distance of movement of the pawl 57 and the spacing of ratchet teeth 58. Holding pawl 61 prevents the wheel from reversing. Attached to shaft 60 of wheel 59 is assumed to be an appropriate fluid valve, or, in the alternative, a feed screw or belt adapted to feed dry material, of which powdered detergent is an example. Whether the shaft 60 actuates a valve controlling the flow of a fluid or controls the flow of a dry substance would be determined by the specific application of the invention. In any case it may be assumed that the solenoid plunger 34 will operate with sufficient power to effect any normally required mechanical operation. In this manner the desired control of an ultimate device may be effected directly by the power derived from a suitable solenoid without the interposition of an additional relay circuit. Under these conditions the contacts 38 may be omitted; or if they be retained, may be employed for the control of any desired external circuit, for example, a signal or indicator circuit.

The embodiment of the invention illustrated in Fig. 5 incorporates certain features above described, together with additional features which will be mentioned below. It will be seen that, in general, the system includes two relays 41 and 42 which in construction are similar to the single relay illustrated in Fig. 2. Relay 41 is, in general, connected in a manner corresponding to that of the relay of Fig. 2, but relay 42 is differently connected especially in that the magnet coils 1a and 2a thereof are connected or wound so as magnetically to oppose each other with respect to the core 17a. Relay 41 is connected so as to control a signalling device such as buzzer 43 which serves as an audible signal or warning to call attention to the departure of the controlled condition from normal. A lamp could be similarly connected for visible signalling. Relay 42 actuates a control element 7 which is assumed to compensate for the mentioned departure from normal and thereby to restore the controlled condition to the normal or balance point.

The system of Fig. 5 may be considered to comprise means for automatically maintaining the concentration of a detergent solution at a preselected value, and to provide a suitable indication when the concentration departs from that value. For the reasons above explained, this system is also adapted to operate from a 20-volt alternating-current supply 10, 10a, such as may be obtained from the secondary winding of a bell-ringing transformer, for example. The power supply to the control apparatus passes through an "on-off" switch 44. A pilot light 45, together with a limiting resistor 46 therefor, is provided to indicate when the power is connected to the apparatus. By closing switch 44, it will be seen that as in Figs. 2 and 4, the sensing circuit including sensing element 9 is connected thereby to the power source through control point adjuster 14. It is usually advisable to connect a fixed resistor 47 in series with control point resistor 14. When the apparatus is employed to control solution concentration as presently assumed, resistor 14 would comprise a titration control.

The sensing coil 2a of relay 42 is connected to the D. C. output of rectifier 27 which, as before, will vary in accordance with the variation of impedance of sensing element 9 here assumed to comprise a conductivity cell, such as referred to in connection with Fig. 1. A filter condenser 50 is connected in shunt to coil 2a. Reset coil 1a, across which a storage condenser 22a is connected, is energized by the circuit including terminal 10, switch 44, the winding of coil 1a, diode 48, limiting resistor 49 and power terminal 10a. Diodes 48 and 53 may comprise the elements of a twin-diode tube of type 6AL5. The cathode heaters 51a and 51 are connected in series from power terminal 10a through current limiting resistors 52, 37, and power switch 44 to power terminal 10. Contacts 20a short out trickle resistor 37 which passes enough current to keep the cathode heaters warm but not hot enough to cause appreciable emission. Thus it will be seen that the energizing current through magnetic coil 1a depends upon the operating condition of diode 48, which in turn is controlled by the contacts 20a on the same relay in which coil 1a is included. The second contacts 21a on relay 42 serve to connect solenoid valve 7 to the power line and these contacts operate simultaneously with contacts 20a.

Relay 41 is, as above mentioned, in general connected in a manner similar to that of relay 2. As in the former case, sensing coil 2 is connected to the direct-current output of the sensing circuit, which may be termed the sensing signal. Reset coil 1 is energized by the circuit including terminal 10, switch 44, its own winding, diode 53, current limiting resistor 54, and power terminal 10a. Thus, the current which energizes reset coil 1, as in the case of coil 1a of relay 42, is dependent upon the condition of diode 53, which, in turn, is controlled by cathode heater 51 connected in series with cathode heater 51a above referred to. Hence, the actuation of relay 41 is to this extent dependent upon the actuation of relay 42.

Briefly, the operation of the control system of Fig. 5 is as follows: At the normal or preselected solution concentration, which herein has been referred to as the "balance point" condition, the voltage drop across element 9 and elements 14, 47 is substantially equally divided, and a certain value of current flows through sensing coil 2a, energizing the feed control relay 42. At the mentioned balance point the net magnetic effect on armature 19a is insufficient to actuate this relay. Also, sensing coil 2 of signalling relay 41 is energized to a certain extent by the current in the sensing circuit, but under the assumed condition this current is insufficient to actuate this relay. Now if the impedance of the sensing device increases slightly, the voltage drop thereacross will increase and more current will flow in sensing coils 2 and 2a. If relay 42 is properly adjusted, the mentioned current through coil 2a will actuate this relay and close contacts 20a and 21a. However, the signalling relay 41 is assumed to be adjusted such that the current then flowing through coil 2 will be insufficient to actuate the relay. When contacts 21a of relay 42 close, the solenoid valve 7 is actuated immediately and thus detergent flows into the solution tank. Since closure of contacts 20a energizes cathode heaters 51 and 51a, the diodes are heating to operating condition while the detergent is feeding.

Current flowing through diode 48 energizes coil 1a of relay 42 and produces a flux which opposes that of sensing coil 2a. Current through diode 53 energizes reset coil 1 of relay 41 producing in core 17 additional flux which aids that from sensing coil 2. As the cathode temperature increases, both diodes conduct increased current. Ultimately the opposing flux in coil 1a reaches a value at which feed control relay 42 is caused to drop out. This cuts off the feed by de-energizing solenoid valve 7 and likewise de-energizing the circuit which includes cathode heaters 51, 51a. Immediately, therefore, the cathode elements begin to cool and the current available in coils 1 and 1a is reduced, slowly approaching zero.

Meanwhile, if the current in coil 2a has been restored to normal level, the flux developed in feed control relay 42 will not be strong enough to pull the relay in again and the control will be satisfied, viz., the balance point will have been reached. However, if the current in coil 2a has not been sufficiently reduced by restoration of normal conditions in the solution tank, the relay 42 will pull in again, repeating the feed cycle. A further unbalance in the sensing circuit will substantially increase the current in coil 2a, as well as in coil 2, allowing the feed control relay to pull in before the diode current reaches zero, and also at the end of the feed cycle, thus requiring that the diode current in coil 1a which produces a flux opposing that from coil 2a rise to a higher value before the relay can drop out.

Any further increase in signal strength in the sensing circuit will require even higher current through diode 48 before relay 42 can drop out. Simultaneously, of course, current through diode 53 will increase, and inasmuch as increased sensing current also increases energizing current in coil 2 of relay 41, the combined flux of coils 2 and 1 will have increased to a point at which the signalling relay 41 will be actuated. When this relay pulls in, closure of contacts 21 connects buzzer 43 across the solenoid 7. This causes the buzzer to sound (if the solenoid 7 is energized), and at the same time connects the bleeder resistor 36 across condenser 11. The latter connection reduces the voltage drop across coil 2, causing the energizing current in that coil to decay. As a result, relay 41 will drop out again opening contacts 20 and 21 and opening the bleeder circuit and the buzzer circuit, respectively. Under these conditions relay 41 will continue to oscillate by periodically actuating and de-actuating until the energizing current in either the sensing circuit or the diode circuit is reduced. If after relay 41 operates one or two times the diode current in coil 1a increases to a value at which relay 42 drops out, the buzzer circuit will be de-energized even though relay 41 continues to oscillate or cycle. This is due to the fact that the buzzer receives its power from the circuit of solenoid 7. As soon as relay 42 drops out the heater current for the diodes is cut off and the cathode elements thereof begin to cool. After a few seconds, therefore, relay 41 will no longer be energized sufficiently to continue oscillating.

If the sensing signal increases further, a value will be reached at which the diode current which energizes coil 1a, although at a maximum, will still be insufficient to cause relay 42 to drop out. In other words, the magnetic effect of the diode current flowing through coil 1a will be less than that of the sensing signal current flowing through coil 2a which opposes it, so that the solenoid 42 will remain actuated. Under these circumstances buzzer 43 will continue to sound repeatedly until the unbalanced condition is corrected and the sensing signal is again reduced to a more nearly normal value. As the control point is approached, the number of oscillations of relay 41, and thus the number of warning signal operations per oscillation or cycle of relay 42, will be gradually reduced until the warning signal relay 41 ceases to oscillate and remains de-actuated. After that the feed relay 42 will cycle a few times more, but less frequently and for increasingly shorter time intervals until the balance point is reached, at which time both relays will remain de-actuated. It will, therefore, be observed that the operational characteristics of the system of Fig. 5 include the desirable aspects of the systems of the previous figures.

The following values of circuit elements applicable to the system of Fig. 5 are given by way of example, and are not to be construed as limitations.

Resistors

| | Ohms |
|---|---|
| 14, 36, 37 | 100 |
| 47 | 25 |
| 55 | 150 |
| 49 | 680 |
| 54 | 330 |
| 52 | 50 |
| 46 | 47 |

Capacitors

| | Mfd. |
|---|---|
| 11, 50 | 500 |
| 22, 22a | 100 |

Relay coils 1, 2, 1a, 2a are of approximately 800 ohms D. C. resistance, each.

I claim:

1. In combination, a magnetically operated switch including first and second magnet coils and contacts which are opened and closed by said switch, said switch being adapted to assume energizing and de-energizing positions controlled at least in part by said first magnet coil, an energizing circuit including said contacts for energizing said first magnet coil, time delay means connected in said energizing circuit for delaying energization of said first magnet coil when said switch assumes said energizing position, whereby said switch is caused to oscillate, means disposing said second magnet coil so as magnetically to influence actuation of said switch, a signal source, and circuit means connecting said source to said second magnet coil independently of said contacts so that said switch automatically oscillates at a period adapted to be modified in accordance with variations in the signal.

2. A self-oscillating relay system including in combination, a relay having an armature and at least two coils magnetically acting thereon, said coils comprising a reset coil and a modulating coil, time delay means for delaying energization of said reset coil including a storage condenser connected to said reset coil, a power source, contacts opened and closed in response to movement of said armature, and charging circuit means including said contacts for simultaneously connecting said source to said condenser and to said reset coil, whereby to form a self-oscillating system, and circuit means for connecting a source of signal current to said modulating coil independently of said contacts so as to modify the rate of oscillation of said relay in accordance with the magnitude of signal current.

3. A self-oscillating relay system including in combination, a relay having an armature and at least two coils magnetically acting thereon, said coils comprising a reset coil and a modulating coil, time delay means for delaying energization of said reset coil including a storage condenser connected in shunt to said reset coil, a power source, contacts opened and closed in response to movement of said armature, and charging circuit means including said contacts for simultaneously connecting said source to said condenser and to said reset coil, whereby to form a self-oscillating system, and circuit means for connecting a source of signal current to said modulating coil independently of said contacts so as to modify the rate of oscillation of said relay in accordance with the magnitude of signal current.

4. The combination in a control system of a relay having an armature and at least two coils which together magnetically control the movement of the armature, one coil being a reset coil and another a modulating coil, contacts on said relay which are opened and closed by movement of said armature, a sensing circuit including a sensing device from which a modulating signal is derived and means independent of said contacts for impressing said signal on the modulating coil so as to modify the effect on the armature of the reset coil as a function of said signal, biasing means exerting a force on said armature opposite to that of said reset coil, a storage condenser connected to said reset coil, a power source connected to charge said condenser, a discharge circuit including said condenser, certain of said contacts and impedance means other than said reset coil, the forces of said reset coil and of said biasing means on said armature being adjusted to cause said relay to oscillate at a rate determined in part by the effect of said modulating coil on said armature, and connections to contacts on said relay for actuating and deactuating an external circuit in response to movements of said armature.

5. A self-oscillating relay system including an electromechanical relay having an armature and at least two magnet coils comprising a reset coil and a modulating coil both magnetically acting on said armature, contacts arranged to be closed and opened by movement of said armature, energizing and de-energizing circuit means connected to said reset coil including said contacts, a condenser and means for connecting said condenser to a power source, said relay being of the type having an inherent operating differential which together with said circuit means causes said relay to oscillate, and means for connecting to said modulating coil independently of said contacts and of said condenser a source of modulating current adapted to modify the actuating and deactuating movement of said armature.

6. A self-oscillating relay system including an electromechanical relay having an armature and at least two magnet coils comprising a reset coil and a modulating coil both magnetically acting on said armature, contacts arranged to be closed and opened by movement of said armature, energizing and de-energizing circuit means connected to said reset coil including said contacts, a condenser and means for connecting said condenser to a power source, said relay being of the type having an inherent operating differential which together with said circuit means causes said relay to oscillate, means operative independently of the position of said armature for connecting to said modulating coil a source of modulating current adapted to modify the actuating and deactuating movements of said armature, means for adjusting the normal rate of oscillation of said relay and means for adjusting the magnitude of said modulating current.

7. A system as defined in claim 5 in which said armature is supported to rock on a pivot, and said reset and modulating coils are disposed one on each side of the pivot so as magnetically to act on opposite ends of the armature.

8. A system as defined in claim 7 which includes an adjustable biasing spring disposed in operable relation to the armature so as to urge the armature to move in the same direction as does the magnetic effect of said modulating coil on said armature.

9. A self-oscillating relay system including an electromechanical relay having an armature, a magnetic core and at least two magnet coils comprising a reset coil and a modulating coil disposed on said core, said armature being so disposed as to be attracted by one end of the core, contacts arranged to be opened and closed by movement of said armature, circuit means for energizing and de-energizing said reset coil including said reset coil, said contacts, a condenser and connecting means for connecting said condenser and reset coil to a power source, said relay being of the type having an inherent operating differential which together with said circuit means causes said relay to oscillate, and means for connecting to said modulating coil independently of said contacts and condenser a source of modulating current to modify the movement of said armature.

10. A system as defined in claim 9 in which said coils are connected to as to be in magnetic opposition.

11. A system as defined in claim 6 which includes a plurality of modulating coils and one reset coil, all of said coils being disposed on a common core, one end of which is disposed in magnetic relation to said armature, a separate source of modulating current connected to each modulating coil, and means connected to each modulating coil for adjusting the magnitude of modulating current therein, said coils being so connected and disposed with respect to said core that the resulting total magnetic flux effective on said armature comprises the algebraic sum of the separate and individual magnetizing forces of the coils, respectively.

12. In a control system, a relay having an armature and a plurality of magnet coils which together control the movement of the armature, said coils comprising a reset coil and at least one modulating coil, contacts on said relay which are closed and opened by movement of said armature, a sensing circuit for each modulating coil including a sensing device from which a modulating signal is derived independently of operation of the relay and means for impressing each signal on its corresponding modulating coil so as to modify the effect of the reset coil independently of said contacts on the armature, biasing means exerting a force on said armature regardless of the armature position opposite to that of the reset coil, circuit means including contacts on said relay, a storage condenser, a source of power and said reset coil which together with the inherent differential of the relay are adapted to cause said relay to oscillate automatically at a rate determined in part by the effect of each modulating coil on said armature, and means for connecting an external circuit to contacts on said relay for controlling external circuit means in response to movements of said armature.

13. A system according to claim 12 which includes a diode connected in circuit with said source of power and said reset coil, cathode heating means for said diode and connections from contacts on said relay to control the current to said heating means.

14. A system according to claim 13 which includes a second relay having a second armature and a plurality of coils which together control the movement of said second armature, one coil being a reset coil and the other a modulating coil, a plurality of contacts on said second relay which are opened and closed by movement of the second armature, means for impressing the signal from said sensing device on the modulating coil of said second relay so as to modify the effect on said second armature of the reset coil thereof, biasing means exerting a force on said second armature opposite to that of said reset coil, circuit means including contacts on said second relay, a storage condenser, a source of power and the reset coil of said second relay which together with the inherent differential of the relay are adapted to cause said second relay to oscillate at a rate determined in part by the effect on said second armature of the modulating coil associated therewith, a second diode connected in circuit with said source of power and the reset coil of said second relay, cathode-heating means for said second diode, connections from contacts on said first-named relay to control said last-named cathode-heating means, a signalling circuit and connections to contacts on said second relay for actuating and deactuating said signalling circuit.

15. A control system according to claim 12 which includes a solenoid coil connected in said external circuit so as to be actuated by closure of contacts of said relay, a plunger movable in said solenoid coil, and means movable by operation of said plunger adapted to actuate control mechanism.

16. A control system according to claim 15 which includes contacts arranged to be actuated by said plunger simultaneously with actuation of said mechanism thereby.

17. A relay adapted to be self-oscillating, which comprises a movable armature carrying a contact, a relatively fixed contact cooperating with the armature contact, resilient means continuously applying a force on said armature tending to close said contacts, first electromagnetic coil means adapted to apply force on the armature in opposition to that of said resilient means and tending to open said contacts, and means for supplementing and augmenting the force exerted on said armature by said first coil means comprising second electromagnetic coil means and delay-action circuit elements connected to said second coil means and to said contacts such as to energize said second means by closing said contacts and to prolong the supplemental force exerted by said second means on the armature after the opening of said contacts.

18. A relay adapted to be self-oscillating, which comprises an electromagnet, an armature actuated thereby, a contact movable by said armature, a contact relatively fixed with respect to the movable contact and positioned to cooperate therewith, resilient means continuously applying force to said armature in opposition to the force of the electromagnet thereon, supplemental means for applying force to said armature in opposition to the force exerted by said resilient means, power source connecting means and connections between said supplemental means, said contacts and said power source connecting means such that the energization of said supplemental means is controlled in response to the operation of said contacts, said supplemental means being characterized in that the force which it applies to the armature slowly decreases with time upon opening of said contacts.

19. A relay adapted to be self-oscillating, which comprises an electromagnet, an armature actuated thereby, contacts closable in response to actuation of said armature by said electromagnet, resilient means continuously applying force to said armature in opposition to the force of the electromagnet thereon, supplemental means for applying force to said armature in opposition to the force exerted by said resilient means, power source connecting means and connections between said supplemental means, said contacts and said power source connecting means such that the energization of said supplemental means decreases in response to the closing of said contacts, said supplemental means being characterized in that the force which it applies to the armature slowly decreases with time upon closing of said contacts.

20. In a self-oscillating relay system, a relay of the type having a movable armature and inherent operating differential, first means including an electromagnet which exerts on said armature a first force adapted to operate the same, contacts operative in response to movement of said armature, said first means also including means for connecting to said electromagnet independently of the position of said armature and of said contacts a source of variable modulating current, second means electrically energized and adapted to exert on said armature a second and changing force in a direction to oppose said first force thereon, power-source-connecting means for furnishing current different from said modulating current, and connections between said second means, said contacts and said power-source-connecting means such that the exertion of said changing force on said armature by said second means is initiated in response to operation of said contacts, said second means being characterized in that the force which it exerts on said armature automatically changes with time beginning with operation of said contacts.

21. In a self-oscillating relay system, a relay of the type having a movable armature and inherent operating differential, first means including an electromagnet which exerts on said armature a first force adapted to operate the same, contacts operative in response to movement of said armature, said first means also including means for connecting to said electromagnet independently of the position of said armature and of said contacts a source of variable modulating current, second means electrically energized and adapted to exert on said armature a second and changing force in a direction to oppose said first force thereon, third means operative to exert on said armature a third and substantially uniform force in a direction to aid one only of said first and second forces, power-source-connecting means for furnishing current different from said modulating current, and connections between said second means, said contacts and said power-source-connecting means such that the exertion of said changing force on said armature by said second means is initiated in response to operation of said contacts, said second means being characterized in that the force which it exerts on said armature automatically changes with time beginning with operation of said contacts, and means controlling the time rate of operation of said second means.

References Cited in the file of this patent

UNITED STATES PATENTS

| | | |
|---|---|---|
| 2,236,981 | Winter | Apr. 1, 1941 |
| 2,277,867 | Losch | Mar. 31, 1942 |
| 2,489,926 | Pearsall | Nov. 29, 1949 |

FOREIGN PATENTS

| | | |
|---|---|---|
| 67,855 | Sweden | Apr. 21, 1928 |